(12) United States Patent
Marsh

(10) Patent No.: US 7,640,563 B2
(45) Date of Patent: Dec. 29, 2009

(54) DESCRIBING MEDIA CONTENT IN TERMS OF DEGREES

(75) Inventor: David J. Marsh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 10/125,259

(22) Filed: Apr. 16, 2002

(65) Prior Publication Data

US 2003/0195891 A1    Oct. 16, 2003

(51) Int. Cl.
*H04N 7/10* (2006.01)
*H04N 7/173* (2006.01)
*H04N 7/16* (2006.01)
*G06F 7/00* (2006.01)

(52) U.S. Cl. .................. 725/45; 725/114; 725/138; 707/100

(58) Field of Classification Search .............. 725/9, 725/13, 24, 28–29, 32, 46, 61, 45
See application file for complete search history.

(56) References Cited

U.S. PATENT DOCUMENTS

| | | | |
|---|---|---|---|
| 4,706,121 A | 11/1987 | Young | |
| 5,844,620 A | 12/1998 | Coleman et al. | |
| 5,969,748 A * | 10/1999 | Casement et al. | 725/28 |
| 5,973,683 A * | 10/1999 | Cragun et al. | 725/29 |
| 5,995,133 A * | 11/1999 | Kim | 725/28 |
| 6,005,597 A | 12/1999 | Barrett et al. | |
| 6,115,057 A * | 9/2000 | Kwoh et al. | 725/28 |
| 6,157,411 A | 12/2000 | Williams et al. | |
| 6,317,885 B1 | 11/2001 | Fries | |
| 6,457,010 B1 | 9/2002 | Eldering et al. | |
| 6,614,987 B1 | 9/2003 | Ismail et al. | |
| 6,651,253 B2 | 11/2003 | Dudkiewicz et al. | |
| 6,698,020 B1 | 2/2004 | Zigmond et al. | |
| 6,704,491 B1 * | 3/2004 | Revis | 386/94 |
| 6,704,931 B1 | 3/2004 | Schaffer et al. | |
| 6,842,761 B2 * | 1/2005 | Diamond et al. | 707/104.1 |
| 6,851,090 B1 * | 2/2005 | Gutta et al. | 715/716 |
| 6,973,665 B2 | 12/2005 | Dudkiewicz et al. | |
| 6,990,677 B1 | 1/2006 | Pietraszak et al. | |
| 7,185,355 B1 | 2/2007 | Ellis et al. | |
| 7,246,128 B2 * | 7/2007 | Jordahl | 707/100 |
| 2001/0021995 A1 | 9/2001 | Hatano | |
| 2001/0041980 A1 | 11/2001 | Howard et al. | |
| 2002/0042923 A1 | 4/2002 | Asmussen et al. | |

(Continued)

FOREIGN PATENT DOCUMENTS

JP    2000067060    8/1998

(Continued)

OTHER PUBLICATIONS

Merriam-Webster's Collegiate Dictionary, Tenth Edition principal copyright 1993, p. 485.*

(Continued)

*Primary Examiner*—John W Miller
*Assistant Examiner*—Chris Parry
(74) *Attorney, Agent, or Firm*—Lee & Hayes, PLLC

(57) ABSTRACT

A media classification system receives media content descriptions from one or more description providers. The media classification system generates a description of media content based on descriptions of the media content received from one or more description providers. The descriptions describe the media content in terms of degrees. The media classification system may generate a composite description based on the received media content descriptions. The media classification system provides the descriptions, in terms of degrees, to one or more program data providers.

34 Claims, 6 Drawing Sheets

U.S. PATENT DOCUMENTS

| | | | |
|---|---|---|---|
| 2002/0059603 | A1 | 5/2002 | Kelts |
| 2002/0073008 | A1 | 6/2002 | Dutta et al. |
| 2002/0104087 | A1 | 8/2002 | Schaffer et al. |
| 2002/0140719 | A1 | 10/2002 | Amir et al. |
| 2002/0144262 | A1 | 10/2002 | Plotnick et al. |
| 2002/0147984 | A1 | 10/2002 | Tomsen et al. |
| 2002/0152463 | A1 | 10/2002 | Dudkiewicz |
| 2003/0023537 | A1 | 1/2003 | Joshi et al. |
| 2003/0066077 | A1 | 4/2003 | Gutta et al. |
| 2003/0093694 | A1 | 5/2003 | Medvinsky et al. |
| 2003/0093793 | A1* | 5/2003 | Gutta .................... 725/46 |
| 2003/0131355 | A1 | 7/2003 | Berenson et al. |
| 2003/0135857 | A1 | 7/2003 | Pendakur et al. |
| 2003/0144922 | A1 | 7/2003 | Schrantz |
| 2004/0041980 | A1 | 3/2004 | Laguette et al. |
| 2005/0004978 | A1 | 1/2005 | Reed et al. |
| 2005/0028194 | A1* | 2/2005 | Elenbaas et al. ............ 725/32 |
| 2005/0172318 | A1 | 8/2005 | Dudkiewicz et al. |
| 2005/0192987 | A1 | 9/2005 | Marsh |
| 2005/0210502 | A1 | 9/2005 | Flickinger et al. |
| 2006/0190966 | A1 | 8/2006 | McKissick et al. |
| 2006/0271958 | A1 | 11/2006 | Ukai et al. |
| 2008/0216115 | A1 | 9/2008 | Kikinis |

FOREIGN PATENT DOCUMENTS

| | | |
|---|---|---|
| JP | 2001134582 | 11/1999 |
| WO | WO 00/40026 | 7/2000 |
| WO | WO 01/47257 | 6/2001 |
| WO | WO 02/11445 | 2/2002 |

OTHER PUBLICATIONS

U.S. Appl. No. 11/119,170, filed Apr. 29, 2005, Marsh, David.

De Jong, A. et al. "Die technische Fachzeitschrift fur Fernsehen, Film und elektronische Medien"; Fernseh-Und Kino-Technik—55, Jahrgang, Nr. 8-Sep. 2001; 10 pages.

Mulder, Peter; "The integration of Metadata from production to consumer"; EBU Technical Review, Sep. 2000; 5 pages; Dutch Broadcast Facilities Company N.V. (NOB).

Evain, Jean-Pierre; "TV-Anytime metadata, A preliminary specification on scheduler!"; EBU Technical Review, Sep. 2000; 14 pages; EBU Technical Department.

Herla, Von Siegbert; "Online-Archive—MIT Metadaten Zum Erfolg"; Dec. 15, 2000; 8 pages.

Joung, Ye Sun; "A Metadata Repository System for an Efficient Description of Visual Multimedia Documents"; Concurrent Engineering: Research and Applications; vol. 9, No. 2, Jun. 2001; 12 pages; Technomic Publishing Co., Inc.; Korea.

Adami, N. et al; "The ToCAI Description Scheme for Indexing and Retrieval of Multimedia Documents"; Multimedia Tools and Applications, 14, 153-173, 2001; Kluwer Academic Publishers, manufactured In The Netherlands.

Jasinschi, R.S., et al.; "Automatic TV Program Genre Classification Based on Audio Patterns"; 2001 IEEE; 6 pages; Philips Research, Scarborough Road, Briarcliff Manor, NY, 10510, USA.

Taskiran, Cuneyt M., et al.; "Discovering Video Structure Using The Psuedo-Semantic Trace"; Proceedings of SPIE vol. 4315 (2001); 8 pages; Video and Image Processing Laboratory, School of Electrical and Computer Engineering, Purdue University, West Lafayette, IN 47907-1285.

McDonald, Kieran, et al.; "Online Television Library: Organisation and Content Browsing for General Users"; Proceedings of SPIE vol. 4315 (2001); 9 pages; Centre for Digital Video Processing, Dublin City University, Ireland.

Liu, Duen-Ren, et al.; "Classifying Video Documents by Hierarchical Structure of Video Contents"; The Computer Journal, vol. 43, No. 5, 2000; 15 pages; Institute of Information Management, National Chiao Tung University, 1001 Ta Hsueh Rd., Hsinchu, Taiwan, Rep. of China.

Truong, Ba Tu, et al.; "Automatic Genre Identification for Content-Based Video Categorization"; 2000 IEEE; 4 pages; Department of Comptuer Science, Curtin Univeristy of Technology, Perth, W. Australia; IBM T.J. Watson Research Center, Yorktown Heights, NY, USA.

Wei, Gang et al.; "TV Program Classification Based on Face and Text Processing"; 2000 IEEE; 4 pages; Computer Science Department, Wayne State University, Detroit MI; Philips Research, Briarcliff Manor, NY.

* cited by examiner

DESCRIBING MEDIA CONTENT IN TERMS OF DEGREES

TECHNICAL FIELD

This invention relates to media entertainment systems and, in particular, to architectures that support media content descriptions in terms of degrees.

BACKGROUND

Many media entertainment systems provide electronic programming guides (EPGS) that allow users to interactively select programs that they are interested in. Systems that employ EPG technology typically display descriptions of programs organized according to the channel on which the program will be broadcast and the time at which the broadcast will occur. The standard way that EPGs describe the genre of a program is to categorize it as a particular program type. For example, a movie may be described as an "Action" movie, a "Mystery" movie, or a "Romance" movie. This type of categorization works well for some programs, such as television quiz shows or news programs. However, because movies and dramas, which tell a story, usually include elements that typically are associated with more than one category, most movies and dramas are not accurately described by the standard genre categorization. For example, a movie may include some amount of action, some amount of mystery, and some amount of romance. Current systems try to describe such a movie as either an "Action" movie, a "Mystery" movie, or a "Romance" movie, with the intent of trying to indicate the genre that corresponds to the most prevalent element in the movie.

An additional way to describe media content is in terms of intent. For example, media content may be intended to entertain, educate, and/or inform an audience.

Users may be able to more accurately determine whether they are interested in a particular piece of media content if they are given access to descriptions that indicate relative degrees of genre and/or intent associated with the media content.

SUMMARY

An architecture that supports media content descriptions in terms of degrees is described. The media classification architecture has a system to receive media content descriptions from one or more providers. The system generates descriptions that indicate relative degrees to which the media content is associated with one or more genre. The system also generates descriptions that indicate relative degrees of intent associated with the media content. The system provides the media content descriptions to one or more program data providers.

BRIEF DESCRIPTION OF THE DRAWINGS

The same numbers are used throughout the drawings to reference like features and components.

DETAILED DESCRIPTION

Introduction

The following describes a media classification system. The media classification system categorizes media content (e.g., a movie or a television show) according to media genre and intent. Media content is first associated with a program type. Examples of possible program types include movie or drama, news, informational, documentary, entertainment, arts, leisure, philosophy, events, sport, advertising, audio, photo, and home movie. Some program types, such as those that are associated with a television quiz show or a news program, effectively describe the media content. However, a single program type does not effectively describe the content of other types of media such as a movie or television drama.

Accordingly, media content that is initially associated with certain program types, such as movie or drama program types, are then further categorized according to genre degrees. Genre is used to further characterize such programs as being, for example, an adventure, a comedy, or a science fiction. Genre degrees can then be thought of as indicators of the degrees to which media content can be described by particular categories. For example, two movies may each be considered romantic comedies. The first movie may include a lot of comedy and only a small amount of romance, while the second movie may include a lot of romance and only a small amount of comedy. By assigning a "degree of comedy" and a "degree of romance" to each movie, a more accurate description of the movie is generated.

Similarly, the media classification system assigns degrees of intent to indicate the purpose of the media content. For example, media content, such as a television program, may be designed to entertain, educate, inform, or sell a product.

The media classification system provides descriptions of media content in terms of genre degrees and intent degrees to content distribution systems. The descriptions are then provided to users, typically in the form of an electronic programming guide (EPG) or through a television recommendation engine. These descriptions allow the user to assess whether they are likely to be interested in watching (or listening to) a particular media content.

The following discussion is directed to media-based entertainment systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and procedures can be used in any of these systems and for any types of client devices, they are described in the context of the following exemplary environment.

Exemplary Environment

Figure 1:
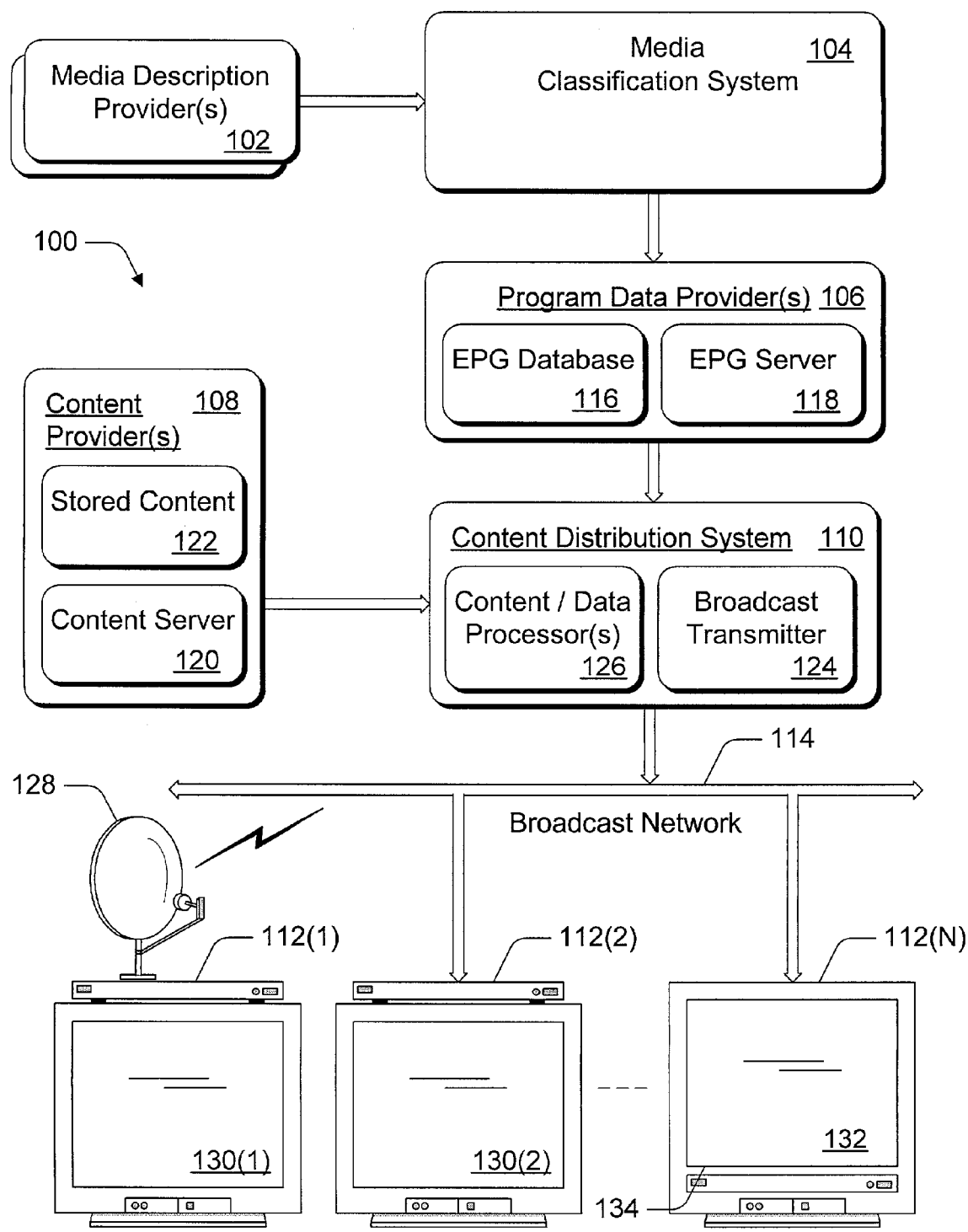
FIG. 1 is a block diagram of an exemplary media entertainment system that facilitates distribution of media content and media content descriptions to multiple users.

FIG. 1 illustrates an exemplary environment 100 in which the methods, systems, and data structures described herein may be implemented. Exemplary environment 100 is a media entertainment system that facilitates distribution of media content and media content descriptions to multiple users. The environment 100 includes one or more media description providers 102, a media classification system 104, one or more program data providers 106, one or more content providers 108, a content distribution system 110, and multiple client devices 112(1), 112(2), ..., 112(N) coupled to the content distribution system 110 via a broadcast network 114.

Media description provider 102 provides descriptions of media content to media classification system 104. Example media description providers are movie production companies, movie distribution companies, movie critics, and music production companies. Any person, company, system, or entity that is able to generate or supply media content descriptions may be considered a media description provider 102.

Media classification system 104 receives descriptions of media from one or more media description providers 102. The media classification system 104 generates a media description in terms of degrees (e.g., genre degrees and intent degrees) based on descriptions of the media content received from one or more media description providers 102. The media classification system 104 may also generate and/or store data that describes other aspects of the media content beyond the scope of genre or intent. Media classification system 104 provides the media content descriptions to program data provider 106.

Program data provider 106 includes an electronic program guide (EPG) database 116 and an EPG server 118. The EPG database 116 stores electronic files of program data, which are used to generate an electronic program guide (or, "program guide"). The program data stored by the EPG database will be referred to as EPG data and may include program titles, ratings, characters, descriptions, actor names, station identifiers, channel identifiers, schedule information, and so on.

The EPG server 118 processes the EPG data prior to distribution to generate a published version of the EPG data which contains programming information for all channels for one or more days. The processing may involve any number of techniques to reduce, modify, or enhance the EPG data. Such processes might include selection of content, content compression, format modification, and the like. The EPG server 118 controls distribution of the published version of the EPG data from program data provider 106 to the content distribution system 110 using, for example, a file transfer protocol (FTP) over a TCP/IP network (e.g., Internet, UNIX, etc.).

Content provider 108 includes a content server 120 and stored content 122, such as movies, television programs, commercials, music, and similar media content. Content server 120 controls distribution of the stored content 122 from content provider 108 to the content distribution system 110. Additionally, content server 120 controls distribution of live media content (e.g., content that was not previously stored, such as live feeds) and/or media content stored at other locations to the content distribution system 110.

Content distribution system 110 contains a broadcast transmitter 124 and one or more content and program data processors 126. Broadcast transmitter 124 broadcasts signals, such as cable television signals, across broadcast network 114. Broadcast network 114 can include a cable television network, RF, microwave, satellite, and/or data network, such as the Internet, and may also include wired or wireless media using any broadcast format or broadcast protocol. Additionally, broadcast network 114 can be any type of network, using any type of network topology and any network communication protocol, and can be represented or otherwise implemented as a combination of two or more networks.

Content and program data processor 126 processes the media content and EPG data received from content provider 108 and program data provider 106 prior to transmitting the media content and EPG data across broadcast network 114. A particular content processor may encode, or otherwise process, the received content into a format that is understood by the multiple client devices 112(1), 112(2), ..., 112(N) coupled to broadcast network 114. Although FIG. 1 shows a single program data provider 106, a single content provider 108, and a single content distribution system 110, environment 100 can include any number of program data providers and content providers coupled to any number of content distribution systems.

Content distribution system 110 is representative of a headend service that provides EPG data, as well as media content, to multiple subscribers. Each content distribution system 110 may receive a slightly different version of the EPG data that takes into account different programming preferences and lineups. The EPG server 118 creates different versions of EPG data (e.g., different versions of a program guide) that include those channels of relevance to respective headend services. Content distribution system 110 transmits the EPG data to the multiple client devices 112(1), 112(2), ..., 112(N). In one implementation, for example, distribution system 110 utilizes a carousel file system to repeatedly broadcast the EPG data over an out-of-band channel to the client devices 112.

Client devices 112 can be implemented in a number of ways. For example, a client device 112(1) receives broadcast content from a satellite-based transmitter via a satellite dish 128. Client device 112(1) is also referred to as a set-top box or a satellite receiving device. Client device 112(1) is coupled to a television 130(1) for presenting the content received by the client device, such as audio data and video data, as well as a graphical user interface. A particular client device 112 can be coupled to any number of televisions 130 and/or similar devices that can be implemented to display or otherwise render content. Similarly, any number of client devices 112 can be coupled to a television 130.

Client device 112(2) is also coupled to receive broadcast content from broadcast network 114 and communicate the received content to associated television 130(2). Client device 112(N) is an example of a combination television 132 and integrated set-top box 134. In this example, the various components and functionality of the set-top box are incorporated into the television, rather than using two separate devices. The set-top box incorporated into the television may receive broadcast signals via a satellite dish (similar to satellite dish 128) and/or via broadcast network 114. In alternate implementations, client devices 112 may receive broadcast signals via the Internet or any other broadcast medium.

Each client 112 runs an electronic program guide (EPG) application and/or a television recommendation engine that utilizes the EPG data. An EPG application enables a television viewer to navigate through an onscreen program guide and locate television shows of interest to the viewer. With an EPG application, the television viewer can look at schedules of current and future programming, set reminders for upcoming programs, and/or enter instructions to record one or more television shows. A television recommendation engine uses the EPG information to automatically generate recommendations for TV shows for the television viewer.

Exemplary Media Classification System

Figure 2:
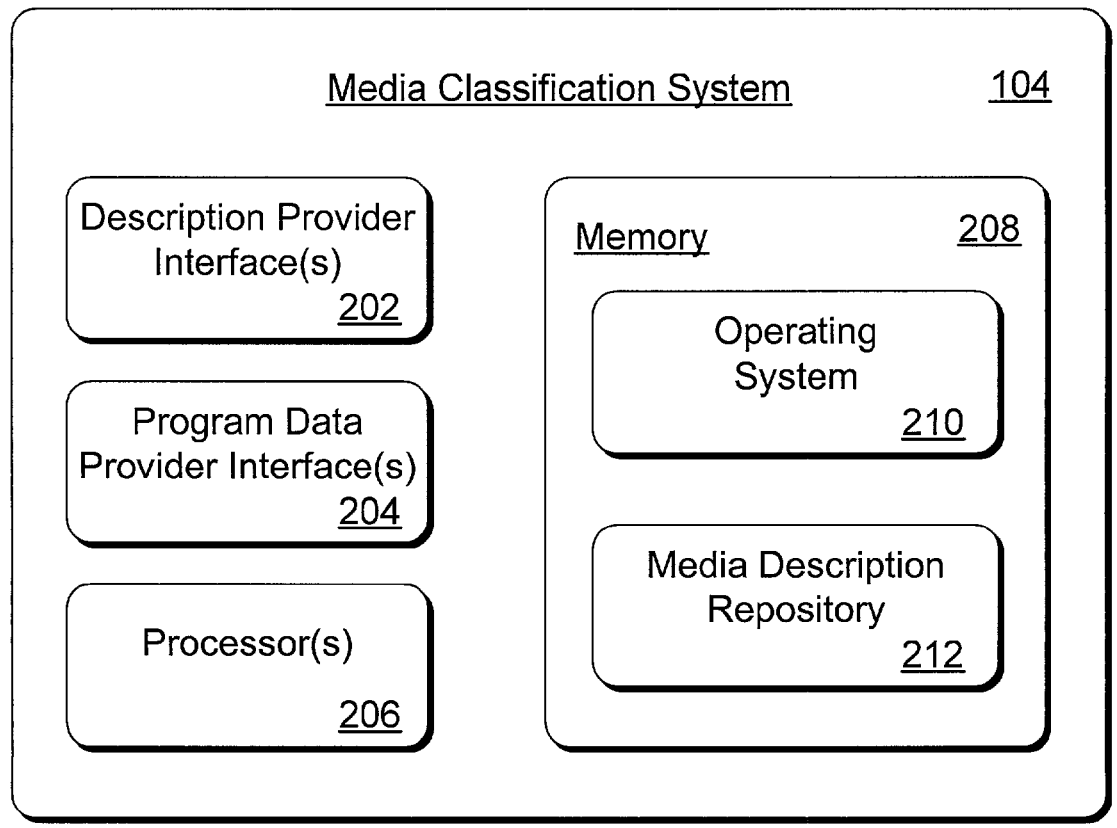
FIG. 2 is a block diagram of selected components of the media classification system shown in FIG. 1.

FIG. 2 illustrates selected components of media classification system 104 shown in FIG. 1. Media classification system 104 includes one or more description provider interfaces 202 that facilitate communication between media classification system 104 and one or more media description providers 102. Media classification system 104 also includes one or more program data provider interfaces 204 that facilitate communication between media classification system 104 and one or more program data providers 106.

Media classification system 104 includes one or more processors 206 and one or more memory components 208. Examples of possible memory components include a random access memory (RAM), a disk drive, a mass storage component, and a non-volatile memory (e.g., ROM, Flash, EPROM, EEPROM, etc.). Alternative implementations of media classification system can include a range of processing and memory capabilities, and may include more or fewer types of memory components than those described. Processor(s) 206 process various instructions to control the operation of the media classification system 104 and to communicate with other electronic and computing devices.

An operating system 210 and a media description repository 212 may be stored in memory 208 and executed on processor 206. Media description repository 212 stores media content descriptions received from one or more media description providers 102, and associates each description with data that identifies the media description provider 102 that provided the description. Media description repository 212 also stores a composite description that describes the media content in terms of degrees to which the media content is associated with one or more genre. Media description repository 212 may be implemented as one or more data repositories.

Exemplary Media Description Repository

Media description repository 212 stores descriptions of media content received from one or more media description providers 102. The data repository may be implemented as a relational database, an object-oriented database, a set of one or more data files, one or more XML files based on an XML schema, or any other data structure method.

Figure 3:
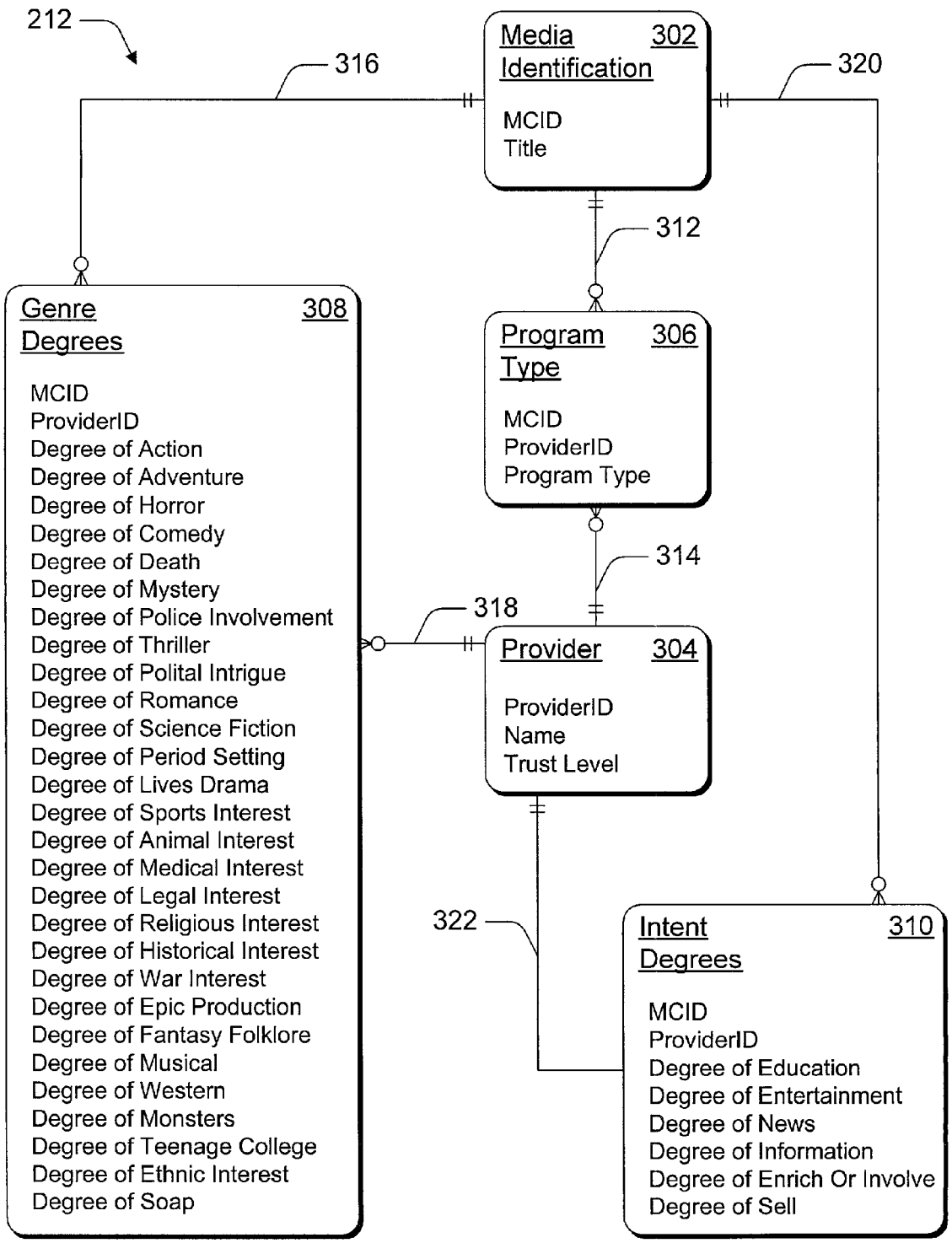
FIG. 3 illustrates the structure of media content descriptions stored in an exemplary media description repository.

FIG. 3 illustrates the structure of media content descriptions stored in an exemplary media description repository. The media description repository 212 includes a media identification class 302, a provider class 304, a program type class 306, a genre degrees class 308, and an intent degrees class 310.

Media Identification Class 302

Media identification class 302 represents media content. Media classification system 104 may receive multiple descriptions of a particular piece of media content (e.g., movie, TV program, music recording, etc.) from multiple media description providers 102. Each piece of media content is assigned a unique media content identifier (MCID) that is stored in the media identification class 302. Multiple descriptions of the same media content are associated with the same MCID to indicate that the descriptions describe the same media content.

The media identification class 302 also stores a title associated with the media content and may, in alternate implementations, store additional data associated with the identity of media content, such as an episode name, an album name, a version indicator, and a part indicator.

Provider Class 304

Provider class 304 represents media description providers 102. Each media description provider 102, is assigned a unique provider identifier (ProviderID) that is stored in the provider class 304. The provider class 304 also stores, for each media description provider 102, the name of the provider and a trust level associated with the provider.

In alternate implementations, the provider class 304 may store additional data associated with a media description provider 102, including a website URL, an email address, and a mailing address.

The trust level is an indication of the level to which descriptions of media content received from a media description provider 102 are trusted in relation to descriptions received from other media description providers 102. In the described implementation, the trust level is numeric. For instance, the trust levels may be assigned a number between 1 and 100. This range provides a relative percentage, such that a media description provider associated with a higher trust level is more trusted than a media description provider associated with a lower trust level. In alternate implementations, the trust level may be numeric, but based on a scale other than a percentage. In another implementation, the trust level may provide a non-numeric representation of trust levels associated with media description providers.

Program Type Class 306

Program type class 306 represents media content descriptions in terms of program types. Many types of media content are adequately described by a single program type. For example, many television programs can be categorized as a news program, a game show, or a sports telecast. The program type class stores, for each media content description received, the MCID associated with the media content, the ProviderID associated with the provider of the description, and a program type that categorizes the media content. Table 1 is a representative, non-inclusive list of program types that can be associated with media content.

Media content that is categorized into the Movie Or Drama program type can be further described in terms of genre degrees.

TABLE 1

Movie Or Drama
None
Unknown
General
News And Current Affairs - General
News And Current Affairs - Daily News
News And Current Affairs - Special News Program
News And Current Affairs - Past News Roundup
News And Current Affairs - News And Current Affairs Magazine
News And Current Affairs - Traffic
News And Current Affairs - Weather
News And Current Affairs - Politics
News And Current Affairs - Economy
News And Current Affairs - Business
News And Current Affairs - Financial
News And Current Affairs - Legal And Investigative Journalism
News And Current Affairs - News About Education
News And Current Affairs - Sports News
News And Current Affairs - Social Report
News And Current Affairs - Press Roundup
News And Current Affairs - Showbiz And Personality News
News And Current Affairs - Service Information
News And Current Affairs - Other
Informational - General
Informational - Money Advice
Informational - Legal Magazine
Informational - Health Magazine
Informational - Personal Problems Magazine
Informational - Shopping
Informational - Interview
Informational - Lecture
Informational - Schools Program
Informational - Speech Or Presentation
Informational - Ethnic
Informational - Language Learning
Informational - Other
Documentary - General
Documentary - Science
Documentary - Technology
Documentary - Engineering And Construction
Documentary - Transport
Documentary - Historical
Documentary - Medical
Documentary - Environment
Documentary - Space
Documentary - Undersea TABLE 1-continued Documentary - Social Science
Documentary - Psychology
Documentary - Legal
Documentary - Music
Documentary - Biography
Documentary - Business And Specific Industries
Documentary - Nature
Documentary - Religions
Documentary - Culture And Traditions
Documentary - Foreign Countries
Documentary - Expeditions And Adventure
Documentary - Politics
Documentary - Past News Events
Documentary - Showbiz
Documentary - Other
General Entertainment And Comedy - General
General Entertainment And Comedy - SitCom
General Entertainment And Comedy - Standup Comedy
General Entertainment And Comedy - Comedy Sketch Show
General Entertainment And Comedy - Comedy News Parody
General Entertainment And Comedy - Reality Show
General Entertainment And Comedy - Variety Show
General Entertainment And Comedy - Courtroom
General Entertainment And Comedy - Celebrity Chat Show
General Entertainment And Comedy - Public Talk Show
General Entertainment And Comedy - Quiz Game Show
General Entertainment And Comedy - Contest Show
General Entertainment And Comedy - Bloopers
General Entertainment And Comedy - Real Life Drama
General Entertainment And Comedy - Surprise Show
General Entertainment And Comedy - Comedy Entertainer Show
General Entertainment And Comedy - Musical Entertainer Show
General Entertainment And Comedy - Magic
General Entertainment And Comedy - Panel Quiz Show
General Entertainment And Comedy - Other
Arts And Culture - General
Arts And Culture - Pop Music
Arts And Culture - Classical Music
Arts And Culture - Old Time Music Hall
Arts And Culture - Paintings And Sculpture
Arts And Culture - Theater And Performing Arts
Arts And Culture - Ballet
Arts And Culture - Opera
Arts And Culture - New Media
Arts And Culture - Traditional
Arts And Culture - Literature And Poetry
Arts And Culture - Languages
Arts And Culture - Architecture
Arts And Culture - Cinema Reviews
Arts And Culture - Tv And Radio Reviews
Arts And Culture - Other
Leisure - General
Leisure - Diy Home
Leisure - Diy Car
Leisure - Cookery
Leisure - Sewing
Leisure - Home Making
Leisure - Gardening
Leisure - Handicrafts
Leisure - Travel And Tourism
Leisure - Dining Out
Leisure - Boating
Leisure - Motoring
Leisure - Motorcycling
Leisure - Cycling
Leisure - Hiking And Camping
Leisure - Outdoors
Leisure - Keep Fit
Leisure - Fashion
Leisure - Computing
Leisure - Video Gaming
Leisure - Audio Video Equipment
Leisure - Pets
Leisure - Antique Collecting
Leisure - Painting And Sculpture Learning
Leisure - Fishing Learning
Leisure - Musical Instruments Learning
Leisure - Skiing Learning
Leisure - Snowboarding Learning
Leisure - Boardsailing Learning
Leisure - Golf Learning
Leisure - Chess Learning
Leisure - Sports Other Learning
Leisure - Other
Religions And Philosophies - General
Religions And Philosophies - Christianity
Religions And Philosophies - Judaism
Religions And Philosophies - Buddhism
Religions And Philosophies - Islam
Religions And Philosophies - Hinduism
Religions And Philosophies - Agnosticism
Religions And Philosophies - Atheism
Religions And Philosophies - Humanism
Religions And Philosophies - Communism
Religions And Philosophies - Socialism
Religions And Philosophies - Capitalism
Religions And Philosophies - Libertarianism
Religions And Philosophies - Republicanism
Religions And Philosophies - Other
Events - General
Events - Nationally Significant Event
Events - Celebrity Event
Events - Non Celebrity Event
Events - Military Event
Events - Political Event
Events - Ceremonies
Events - Festivals
Events - Other
Sport - General
Sport - Acrobatics
Sport - Aeronautics
Sport - Aikido
Sport - American Football
Sport - Archery
Sport - Athletics
Sport - Badminton
Sport - Bandy
Sport - Baseball
Sport - Basketball
Sport - Biathlon
Sport - Billiards
Sport - Board Sailing
Sport - Bobsleighing And Tobogganing
Sport - Body Building
Sport - Boule And Bowls
Sport - Bowling
Sport - Boxing
Sport - Canoeing
Sport - Casting
Sport - Chess
Sport - Computer Gaming
Sport - Cricket
Sport - Croquet
Sport - Curling
Sport - Cycling
Sport - Dance Sport
Sport - Darts
Sport - Diving And Subaquatics
Sport - Dog Racing
Sport - Equestrian Excluding Horse Racing
Sport - Faustball
Sport - Fencing
Sport - Fishing
Sport - Flying Disc
Sport - Golf
Sport - Gymnastics
Sport - Handball
Sport - Hockey
Sport - Horse Racing
Sport - Ice Hockey
Sport - Jai Alai
Sport - Judo
Sport - Jujitsu
Sport - Karate
Sport - Korfball
Sport - Lacrosse
Sport - Luge
Sport - Maccabi TABLE 1-continued Sport - Marathon
Sport - Modem Pentathlon
Sport - Motor Boating
Sport - Motorcycling
Sport - Motor Racing Cars
Sport - Mountaineering
Sport - Netball
Sport - Orienteering And Hiking
Sport - Polo
Sport - Power Lifting
Sport - Racquetball And Squash
Sport - Roller Skating
Sport - Rowing
Sport - Rugby
Sport - Running
Sport - Shooting
Sport - Skating Ice
Sport - Skibob
Sport - Skiing
Sport - Sky Diving
Sport - Sleddog
Sport - Snooker
Sport - Snowboarding
Sport - Soccer Football
Sport - Soft Tennis
Sport - Softball
Sport - Sombo
Sport - Sumo Wrestling
Sport - Surfing
Sport - Swimming And Diving
Sport - Table Tennis
Sport - Taekwondo
Sport - Tennis
Sport - Track And Element
Sport - Trampoline
Sport - Triathlon
Sport - Tug Of War
Sport - Volleyball
Sport - Water Polo
Sport - Water Skiing
Sport - Weight Lifting
Sport - Wrestling
Sport - Yachting
Sport - Other Ball Game
Sport - Other Combative Sport
Sport - Other Martial Sports
Sport - Other Oriental Sports
Sport - Other Team Sport
Sport - Other Water Sport
Sport - Other Winter Sport
Sport - Other
Advertising - General
Advertising - Medicine And Sanitary Products
Advertising - Toiletries
Advertising - Cosmetics
Advertising - Alcohol And Tobacco
Advertising - Soft Drinks
Advertising - Sweets And Puddings
Advertising - Foods
Advertising - Household Cleaning And Painting
Advertising - Household Furnishings TABLE 1-continued Advertising - Audio Video Equipment
Advertising - Computers And Cameras
Advertising - Cars Bikes And Boats
Advertising - Pets
Advertising - Clothes And Shoes
Advertising - Entertainment
Advertising - Travel And Hotels
Advertising - Restaurants
Advertising - Shopping Stores
Advertising - Financial Services And RealEstate
Advertising - Publications
Advertising - Public Utilities
Advertising - Company Publicity
Advertising - Government Information
Advertising - Political
Advertising - TV Program Trailers
Advertising - Direct Sell
Advertising - Infomercial
Advertising - Other
Audio - General
Audio - Music Track
Audio - Book
Audio - Talk
Audio - Music And Talk
Audio - Other
PhotoOrHomeMovie - General
PhotoOrHomeMovie - Professional Of Place
PhotoOrHomeMovie - Professional Of People
PhotoOrHomeMovie - Professional Of Event
PhotoOrHomeMovie - Professional Of Document
PhotoOrHomeMovie - Professional Graphic
PhotoOrHomeMovie - Amateur Of Place
PhotoOrHomeMovie - Amateur Of People
PhotoOrHomeMovie - Amateur Of Event
PhotoOrHomeMovie - Amateur Of Document
PhotoOrHomeMovie - Amateur Graphic
PhotoOrHomeMovie - Other
Other The media description repository 212 includes an association 312 between the media identification class 302 and the program type class 306 and an association 314 between the provider class 304 and the program type class 306. The associations 312 and 314 represent program types associated with media content from multiple media description providers.

Genre Degrees Class 308

The genre degrees class 308 represents descriptions of media content categorized as Movie Or Drama in the program type class 306. The genre degrees class 308 stores, for each description received that associates the Movie Or Drama program category with the media content, the MCID associated with the media content, the ProviderID associated with the media description provider 102 that provided the description, and indicators of degrees to which the media content is associated with multiple genre. In the described implementation, the genres that can be associated with media content are listed and described in Table 2.

TABLE 2

| | |
|---|---|
| Action | Examples include movies with a lot of car chases and explosions. |
| Adventure | Examples include the "Indiana Jones" movies. |
| Horror | Examples are intended to scare the audience. |
| Comedy | Examples are intended to make the audience laugh. |
| Death | Examples include murder mysteries with several morgue scenes. |
| Mystery | Examples intend to make it difficult for the audience to figure out "who did it". |
| Police Involvement | Examples include detective series such as "Hill Street Blues" or "Law and Order". |
| Thriller | Examples are intended to create a heightened sense of anxiety or anticipation in members of the audience. |

TABLE 2-continued

| | |
|---|---|
| Political Intrigue | An example series is "The West Wing". |
| Romance | An example is a movie or drama in which the leading man and woman fall in love after a long and tortuous courtship. |
| Science Fiction | Examples include the "Star Wars" movies and the "Star Trek" television series. |
| Period Setting | An example is the BBC drama, "Pride and Prejudice". |
| Lives Drama | Examples include movies or television programs that follows various generations of a family or dynasty. |
| Sports Interest | Example movies include "Field of Dreams", "Angels in the Outfield", and "Hoosiers". |
| Animal Interest | An example is a drama about Jane Goodall living with gorillas. |
| Medical Interest | An example television series is "ER". |
| Legal Interest | Examples include movies or dramas with several courtroom scenes. |
| Religious Interest | An example is a movie in which a priest is the hero. |
| Historical Interest | An example is a movie set in India at the turn of the $18^{th}$ century. |
| War Interest | An example is a movie about World War II. |
| Epic Production | An example is a movie that includes a large number of Roman legionaries. |
| Fantasy Folklore | Examples include movies with goblins or dream sequences. |
| Musical | Examples include, "Oklahoma", "Mary Poppins", and "Cats". |
| Western | Examples include movies or television programs set in the old west with cowboys and gunfighters. |
| Monsters | Examples include special effects monsters, such as "Godzilla" or "Jaws". |
| Teenage College | Examples may be set in or around a high school or college. |
| Ethnic Interest | An example may be a movie that follows the exploits of people in a particular cultural community. |
| Soap | Examples include soap operas. |

For each genre, the genre degrees class stores an indicator of the degree to which the media content identified by the MCID relates to the genre, according to the description received from the provider indicated by the ProviderID. In the described implementation, the indicator is numeric, and more specifically indicates a percentage. For example, a provider may submit a description of the movie "Jaws" that characterizes the movie as a horror film. An associated record in the genre degrees class may have the horror field set to a value of 100 and all of the other genre fields set to a value of 0. Another provider may submit a description of the same movie, "Jaws", that characterizes the movie as a monster film. An associated record in the genre degrees class may have the monsters field set to a value of 100 and all of the other genre fields set to a value of 0. In an alternate implementation, the genre degrees may not indicate a percentage, and may not be numeric. The genre degrees indicate relative associations between media content and multiple genres.

In addition to storing descriptions received from the media description providers, the media classification system 104 also generates and stores composite descriptions of media content. For example, given the example descriptions received for the movie "Jaws" a composite description may indicate that the movie "Jaws" is 50% a horror movie and 50% a monster movie. A composite description may be stored in the genre degrees class 308 with a ProviderID, indicating a company or other entity that performs data aggregation in support of composite description generation. Alternatively, the ProviderID may be set to a null or other pre-determined value that indicates that the composite description is not associated with a specific media description provider.

However, if the providers of the "Jaws" descriptions have different trust levels, the composite description may indicate different percentages of horror and monster content. For example, if the provider that characterized the movie as a horror movie has a 75% trust level and the provider that characterized the movie as a monster movie has a 50% trust level, then the composite description may indicate that the movie is 75% horror and 50% monster (each provider's trust level is multiplied by the degree indicated by the provider's description; 100% horror*75(first provider's trust level) =75% horror and 100% monster*50 (second provider's trust level)=50% monster).

As shown in the above example, factoring in the provider trust levels may result in a description in terms of genre degrees in which the sum of the degrees is greater than 100%. Even though the sum of the genre degrees is greater than 100, they still indicate relative associations between the media content and the genres. To provide a composite description in which the sum of the degrees equals 100%, the media classification system 104 normalizes the genre degrees in the composite description to total 100%. For example, given the example above, in which the composite indicates that the movie "Jaws" is 75% horror and 50% monster, multiplying each genre degree by 100 and dividing the result by 125 (the sum of the degrees) results in a description in which the sum of the genre degrees is 100 (i. e., "Jaws" is 60% horror and 40% monster).

Normalizing the genre degrees to sum to 100 generates descriptions that are consistent across multiple media content. In this way, users are able to compare descriptions of multiple movies where the genre degrees are based on the same scale. For example, if the sum of genre degrees associated with a first movie is 100 and the sum of genre degrees associated with a second movie is 200, then if both have an action degree of 50, the user may be mislead to believe that the two movies have equal degrees of action, when in fact, the first move has a higher degree of action compared to the second movie.

The media description repository 212 includes an association 316 between the media identification class 302 and the genre degrees class 308 and an association 318 between the provider class 304 and the genre degrees class 308. The associations 316 and 318 represent descriptions of media content in terms of degrees of genres, the descriptions received from multiple media description providers.

Intent Degrees Class 310

The intent degrees class 310 represents indicators of the purpose for the media content. Similar to the classification of movies and dramas in terms of genre degrees, the intent of media content can be characterized in terms of degrees of intent. The intent degrees class 310 stores the MCID associated with the media content, the ProviderID associated with the media description provider 102 that provided the description of the media content, and indicators of degrees of intent of the media content. The intent, or purpose, of the media content may be to educate, to entertain, to provide news, to provide information, to enrich or involve, or to sell a product. For example, the intent of a broadcast television nightly news program may be characterized as 100% news, while the television series "Sesame Street" may be characterized as 50% entertainment and 50% education. A similar process, as described above with reference to the genre degrees class 308, may be used to generate a composite intent description using the received media content descriptions and the provider trust levels stored in the provider class 304. The intent degrees may be normalized to a scale, for example percentages, similar to the normalizing of genre degrees as described above.

The media description repository 212 includes an association 320 between the media identification class 302 and the intent degrees class 308 and an association 322 between the provider class 304 and the intent degrees class 308. The associations 320 and 322 represent descriptions of media content in terms of degrees of intent, the descriptions received from multiple media description providers.

Receiving, Generating, and Providing Media Content Descriptions

Figure 4:
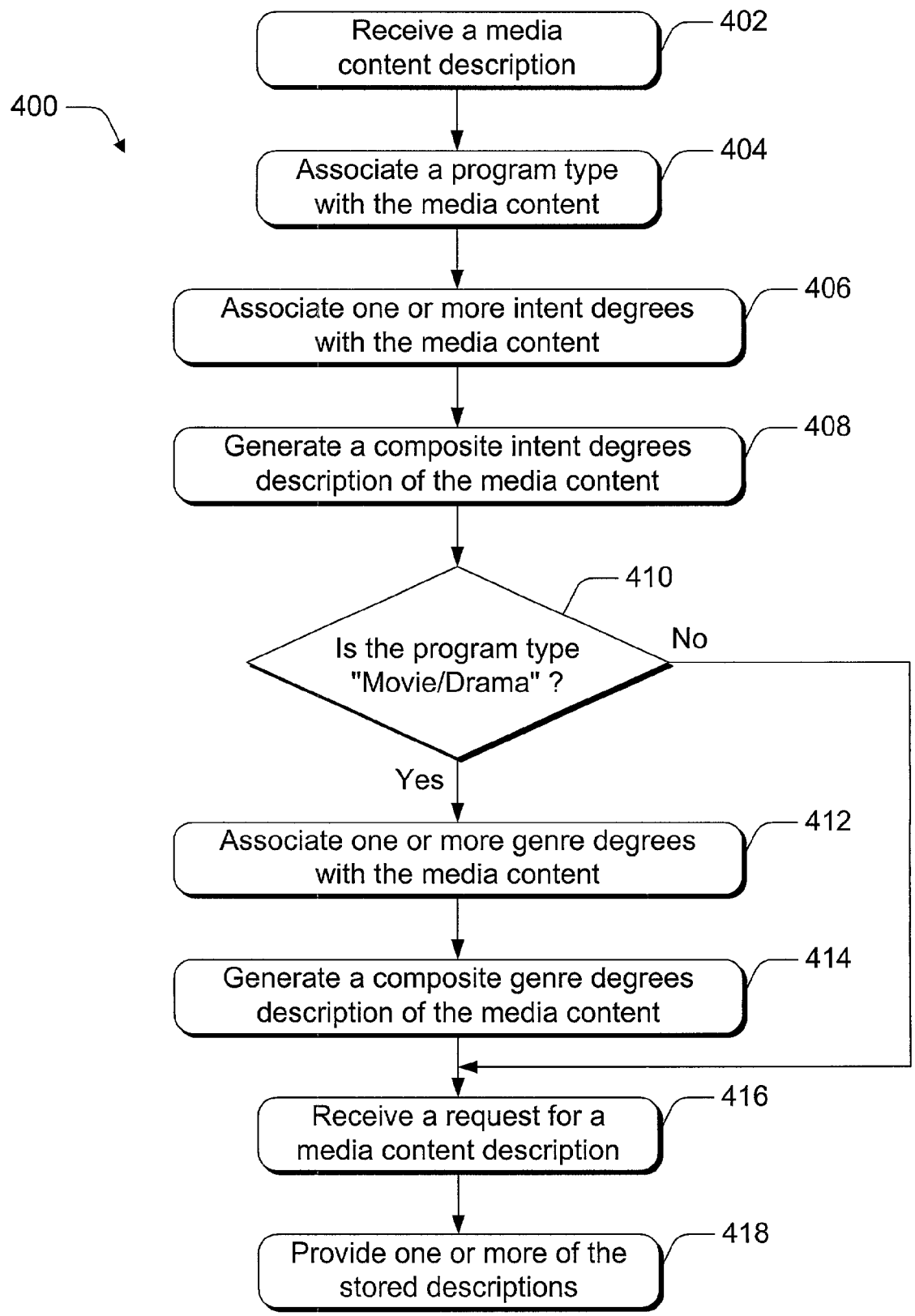
FIG. 4 is an example flow diagram of a process for receiving, generating, and providing media content descriptions.

FIG. 4 illustrates a process 400 for receiving, generating, and providing media content descriptions. This process applies to receiving a plurality of media content descriptions from one or more media description providers 102, generating composite descriptions of the media content, and providing one or more descriptions of the media content to one or more program data providers 106. The process is illustrated as a set of operations shown as discrete blocks. The process may be implemented in any suitable hardware, software, firmware, or combination thereof. The order in which the operations are described is not to be construed as a limitation. Where appropriate, the process will be described with respect to components illustrated in FIGS. 1-3.

At block 402, a media classification system 104 receives a media content description from a media description provider 102. In one implementation, the description provider interface 202 through which the media description provider 102 submits the media content description, is a user interface that allows a description provider to enter data directly into the media description repository 212 according to the structure illustrated in FIG. 3. In alternate implementations, the description received from a media description provider may include a textual description of the media content, or a set of formatted data fields.

At block 404, the media classification system 104 associates a program type with the media content. For example, the media classification system stores a new entry in the program type class 306 to represent a program type associated with the described media content. The program type may be explicitly stated in the received description or the media classification system may determine the program type based on keywords found in the received description.

At block 406, the media classification system 104 associates one or more degrees of intent with the described media content. For example, the media classification system 104 stores a new entry in the intent degrees class 310 to represent the intent of the described media content. The process for associating degrees of intent with the media content is similar to the process for associating genre degrees with the media content, which is described below with reference to block 412, and in more detail with reference to FIG. 5.

At block 408, the media classification system 104 generates a composite description of the described media content in terms of degrees of intent. For example, the media classification system 104 stores a new entry in the intent degrees class 310 that represents a composite of the already stored descriptions of intent associated with the media content. The process for generating a composite intent degrees description is similar to the process for generating a composite genre degrees description, which is described below with reference to block 414, and in more detail with reference to FIG. 6.

At block 410, the media classification system 104 determines whether the program type associated with the media content is "Movie Or Drama". If the program type associated with the media content is not "Movie Or Drama" (the "no" branch from block 410), then the process continues as described below at block 416.

When the program type associated with the media content is "Movie Or Drama" (the "yes" branch from block 410), then the media classification system 104 associates one or more genre degrees with the media content (block 412) by storing a new entry in the genre degrees class 308. A process for associating genre degrees with media content is described in more detail below with reference to FIG. 5.

At block 414, the media classification system 104, generates a composite description of the described media content in terms of genre degrees, for example by storing a new entry in the genre degrees class 310 that represents a composite of the already stored descriptions of genre associated with the media content. The process for generating a composite genre degrees description is described below in more detail with reference to FIG. 6.

At block 416, the media classification system 104 receives a request for a description of the media content, for example from program data provider 106.

At block 418, the media classification system 104 provides one or more descriptions of the media content to the program data provider 106. The media classification system 104 may provide the composite description of the media content, or may provide one or more descriptions of the media content received from media description providers 102.

Associating Degrees with Media Content

Figure 5:
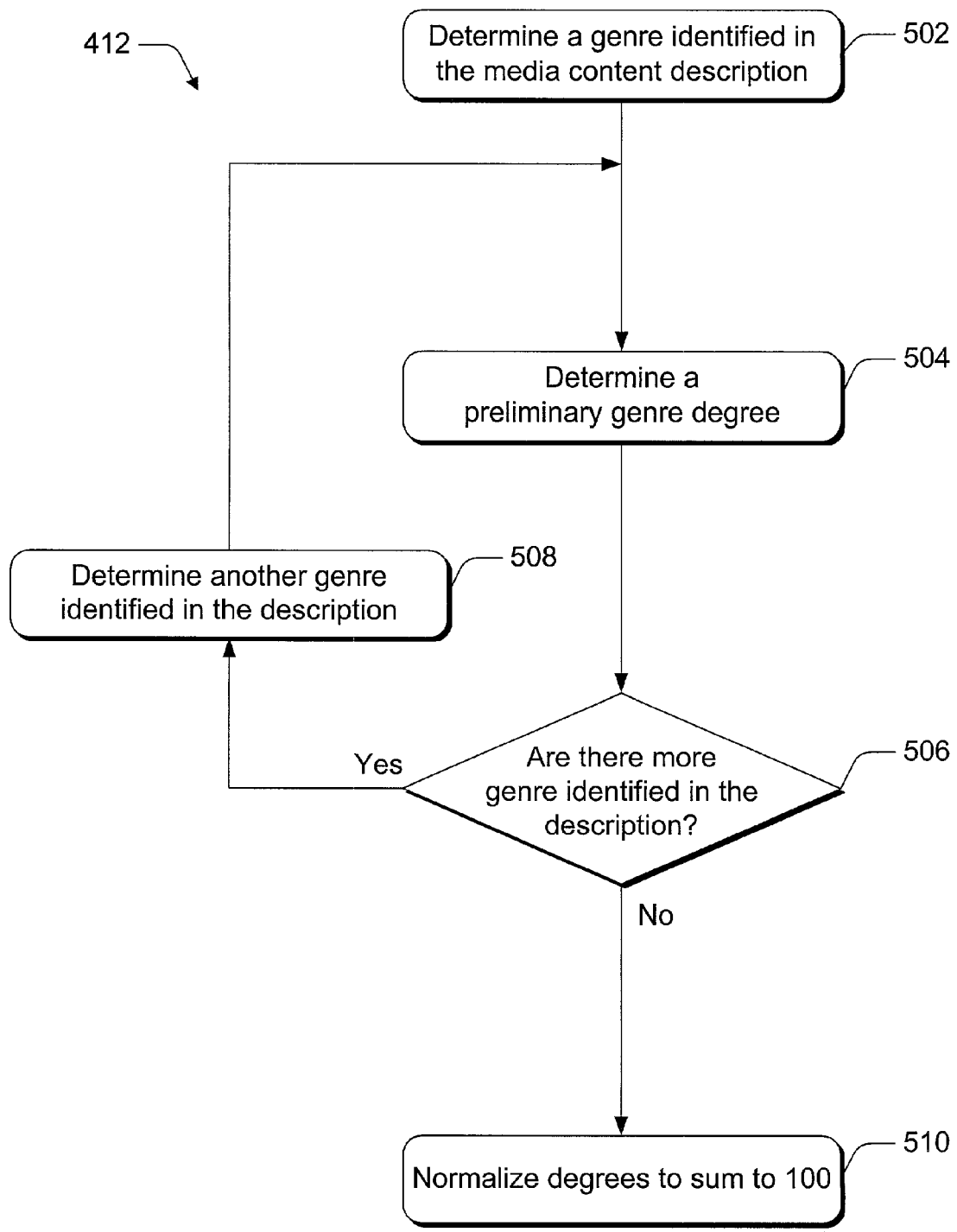
FIG. 5 is an example flow diagram of a process for generating a media content description in terms of degrees.

FIG. 5 illustrates a process for generating a media content description in terms of degrees. This process applies to associating degrees of intent or degrees of genre with media content, as described with reference to blocks 406 and 412 of FIG. 4, respectively. For illustrative purposes, the process is described as a process for associating degrees of genre with media content, but as stated, the process also applies to associating degrees of intent with media content. The process is illustrated as a set of operations shown as discrete blocks. The process may be implemented in any suitable hardware, software, firmware, or combination thereof. The order in which the operations are described is not to be construed as a limitation. Where appropriate, the process will be described with respect to components illustrated in FIGS. 1-3.

At block 502, a media classification system 104 determines a genre identified in the received media content description. In one implementation, the description provider interface 202 through which the media description provider 102 submits the media content description, is a user interface that allows a description provider to enter data directly into the media description repository 212 according to the structure illustrated in FIG. 3. In alternate implementations, the description received from a media description provider may include a textual description of the media content, or a set of formatted data fields.

In one implementation, the media classification system 104 identifies genre associated with the media content by comparing keywords found in the received description with sets of keywords associated with various genre. The sets of keywords associated with various genres can be improved over time through a process of analyzing media content for which the genre classification is known. A media content description in terms of genre degrees may also be generated by identifying keywords found in the complete script of the content, which can be obtained by capturing the Closed Caption (subtitle) information that is available during the time-shifting record process. In an alternate implementation, genres associated with media content are determined through an analysis of the media content. For example, an assessment of whether or not a movie is associated with an action genre may be performed by counting the number of explosions that occur during the film.

At block 504, the media classification system 104 determines a preliminary genre degree associated with the genre determined as described in block 502. The determination of a preliminary genre degree may vary depending on how the genre is identified. For example, in an implementation in which the genre is identified based on keywords found in the description compared with keywords associated with various genre, the preliminary degree associated with the identified genre may be the number of keywords that were found in the description that are also associated with the identified genre (or a number based on the number of keywords found).

Alternatively, the received description may explicitly identify one or more genre. If the received description identifies a genre, the preliminary degree may be set to a specific number, for example, 100. Additionally, a description that explicitly identifies one or more genre may also explicitly specify a degree associated with the genre. In this case, the preliminary degree may be set to the degree specified in the description, or a numerical representation of the specified degree.

At block 506, the media classification system 104 determines whether more genres are identified in the received description of the media content.

If there are more genres identified in the media content description (the "yes" branch from block 506), the media classification system determines another genre identified in the media content description (block 508) and continues the process at block 504.

At block 510, when the media classification system 104 determines that there are no more genres identified in the media content description (the "no" branch from block 506), the media classification system 104 normalizes the preliminary genre degrees determined in block 504, such that the sum of the genre degrees associated with the media content is 100, and thus the degrees represent a percentage to which the media content is associated with the genre. The preliminary genre degrees can be normalized using the following equations:

$$S = \sum_{x=1}^{n} P_x \quad (1)$$

$$G_x = \frac{(P_x)(100)}{S} \quad (2)$$

Equation (1) is used to calculate S, the sum of the preliminary genre degrees associated with media content, where $P_x$ is the preliminary degree associated with the $x^{th}$ genre and n is the number of genre associated with the media content.

Equation (2) is used to calculate $G_x$, the degree associated with the $x^{th}$ genre associated with the media content.

The media classification system 104 stores the normalized genre degrees as an entry in the genre degrees class 308 in the media description repository 212.

Generating a Composite Description

Figure 6:
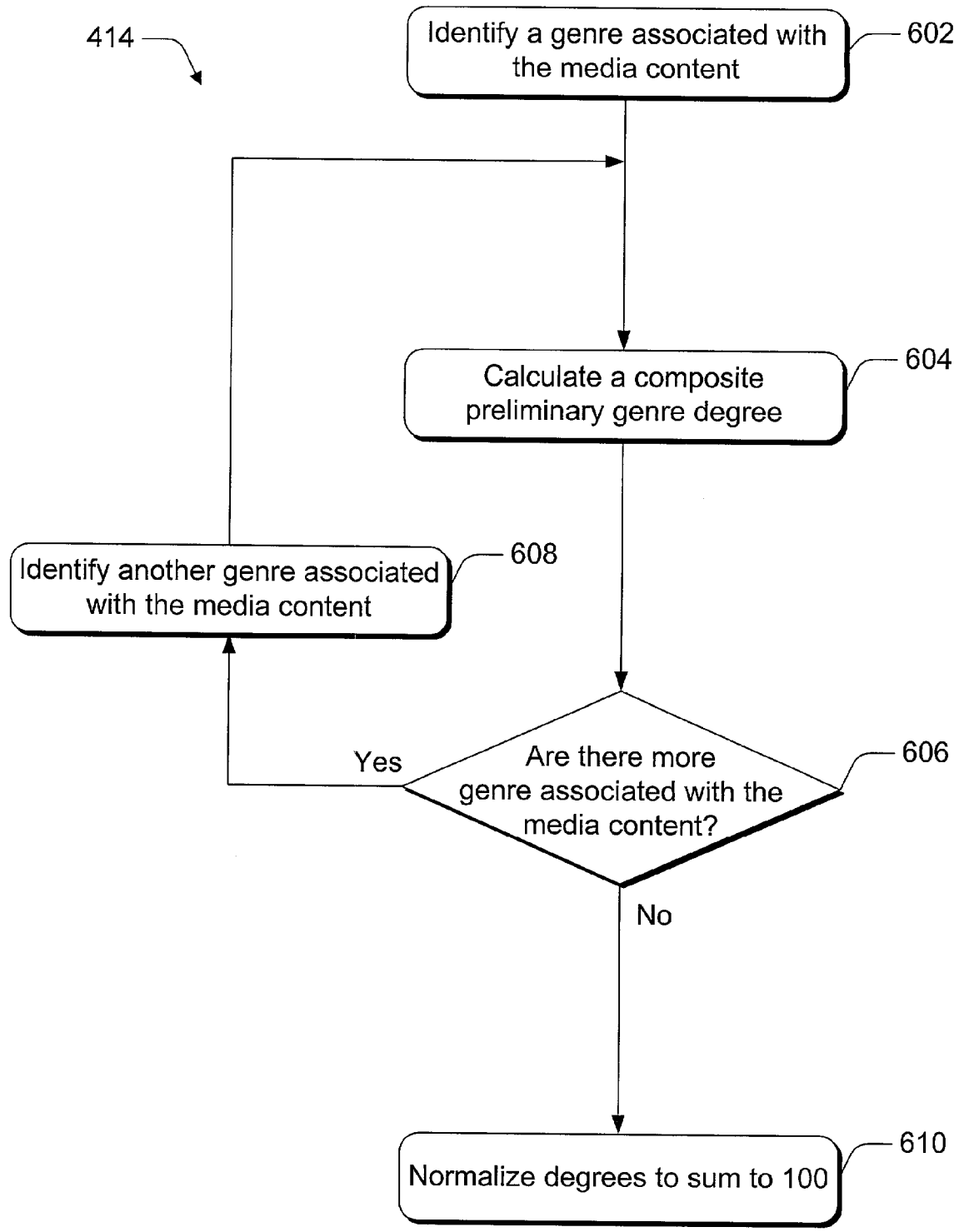
FIG. 6 is an example flow diagram of a process for generating a composite media content description.

FIG. 6 illustrates a process for generating a composite media content description. This process applies to generating a composite description in terms of degrees of intent or in terms of degrees of genre, as described with reference to blocks 408 and 414 of FIG. 4, respectively. For illustrative purposes, the process is described as a process for generating a composite description in terms of degrees of genre, but as stated, the process also applies to generating a composite description in terms of degrees of intent. The process is illustrated as a set of operations shown as discrete blocks. The process may be implemented in any suitable hardware, software, firmware, or combination thereof. The order in which the operations are described is not to be construed as a limitation. Where appropriate, the process will be described with respect to components illustrated in FIGS. 1-3.

At block 602, a media classification system 104 identifies a genre associated with the media content. For example, the media classification system 104 examines the entries in the genre degrees class 308 that are associated with the described media content (based on the MCID) and identifies a genre (Action, Adventure, Horror, Comedy, etc.) that has a value.

At block 604, the media classification system 104 calculates a composite preliminary genre degree associated with the identified genre. The composite preliminary degree is calculated using the following equation:

$$CP = \sum_{x=1}^{p} (G_x)(T_x) \quad (3)$$

where:

CP is the composite preliminary degree associated with a genre;

p is the number of providers that are associated with entries in the genre degrees class that indicate a degree associated with the genre and associated with the media content;

$G_x$ is the degree stored in the genre degrees class 308 associated with the genre, the media content, and the $x^{th}$ provider;

$T_x$ is the trust level stored in the provider class 304 associated with the $x^{th}$ provider.

The composite preliminary degree is the sum of all of the degrees associated with the identified genre that are stored in the genre degrees class 308 associated with the described media content.

At block 606, the media classification system 104 determines whether more genres are associated with the media content.

If there are more genres associated with the media content (the "yes" branch from block 606), the media classification system identifies another genre associated with the media content (block 608) and continues the process at block 604.

At block 610, when the media classification system 104 determines that there are no more genres identified in the media content description (the "no" branch from block 606), the media classification system 104 normalizes the preliminary genre degrees determined in block 604, such that the sum of the genre degrees associated with the media content is 100, and thus the degrees represent a percentage to which the media content is associated with the genre. The composite preliminary genre degrees can be normalized using the following equations:

$$CS = \sum_{x=1}^{n} CP_x \quad (4)$$

$$CG_x = \frac{(CP_x)(100)}{CS} \quad (5)$$

Equation (4) is used to calculate CS, the sum of the composite preliminary genre degrees associated with media content, where $CP_x$ is the composite preliminary degree associated with the $x^{th}$ genre and n is the number of genre associated with the media content.

Equation (5) is used to calculate $CG_x$, the composite degree associated with the $x^{th}$ genre associated with the media content.

The normalized genre degrees are then stored as another entry in the genre degrees class 308, associated with the media content. The ProviderID may be set to a value that indicates a company or other entity that performs data aggregation in support of composite description generation. Alternatively, the ProviderID may be set to null or to a pre-determined value to indicate that the entry represents a composite description of the media content.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for describing media content implemented by a computing device including one or more processors, the method comprising:
receiving from a first provider, a first description of a media content, wherein the first description identifies a first genre associated with the media content;
receiving from a second provider, a second description of a media content, wherein the second description identifies a second genre associated with the media content;
determining a first trust level associated with the first provider and a second trust level associated with the second provider;
utilizing the one or more processors for calculating first and second degree values based on the first and second trust levels, wherein the first and second degrees indicate how related the first and second genres are to the media content relative to one another; and
providing for a user, a description of the media content, wherein the description of the media content comprises the first and second degrees and the corresponding first and second genres.

2. The method as recited in claim 1, wherein each genre is selected from a group of genres consisting of action, adventure, horror, comedy, death, mystery, police involvement, thriller, political intrigue, romance, science fiction, period setting, lives drama, sports interest, animal interest, medical interest, legal interest, religious interest, historical interest, war interest, epic production, fantasy folklore, musical, western, monsters, teenage college, ethnic interest, and soap.

3. The method as recited in claim 1, wherein the determining comprises:
receiving a text associated with the media content; and
identifying one or more genres associated with keywords in the text.

4. The method as recited in claim 3, wherein the text comprises at least one of a description of the media content and a script associated with the media content.

5. The method as recited in claim 1, wherein the first and second degrees are numerical.

6. The method as recited in claim 5, wherein the sum of the numbers associated with the genres is 100.

7. A method implemented by a computing device including one or more processors, the method comprising:
receiving a first description that identifies a first genre associated with media content and a second description that identifies a second genre associated with the media content, wherein the first and second genres respectively represent first and second types of media content;
determining a first trust level associated with a first description provider from which the first description is received;
determining a second trust level associated with a second description provider from which the second description is received;
utilizing the one or more processors for determining a first degree based on the first trust level and a second degree based on the second trust level;
assigning the first degree to the first genre and the second degree to the second genre to indicate how relative the first and second genres are to the media content; and
providing for display, a representation of the media content, wherein the representation of the media content comprises an indication of how relative the first and second genres are to the media content.

8. The method as recited in claim 7, wherein each genre is selected from a group of genre comprising action, adventure, horror, comedy, death, mystery, police involvement, thriller, political intrigue, romance, science fiction, period setting, lives drama, sports interest, animal interest, medical interest, legal interest, religious interest, historical interest, war interest, epic production, fantasy folklore, musical, western, monsters, teenage college, ethnic interest, and soap.

9. The method as recited in claim 7, wherein the determining a first degree based on the first trust level and a second degree based on the second trust level comprises:
multiplying a number by the first trust level to produce the first degree; and
multiplying the number by the second trust level to produce the second degree.

10. The method as recited in claim 7, wherein the first and second trust levels are numerical, and wherein the determining a first degree based on the first trust level and a second degree based on the second trust level comprises:
   calculating a preliminary first degree by multiplying the first trust level by 100;
   calculating a preliminary second degree by multiplying the second trust level by 100;
   calculating the first degree by dividing a product of the preliminary first degree and 100 by a sum of the preliminary first degree and the preliminary second degree; and
   calculating the second degree by dividing a product of the preliminary second degree and 100 by the sum of the preliminary first degree and the preliminary second degree.

11. The method as recited in claim 7, wherein the first and second degrees are numerical.

12. The method as recited in claim 7, wherein the first degree and second degree are identical, indicating that the media content is equally associated with the first and second genre.

13. The method as recited in claim 7, further comprising: receiving a third description that identifies the second genre associated with the media content.

14. The method as recited in claim 13, wherein:
   the receiving a third description comprises receiving the third description from a third description provider, the third description provider being associated with a third trust level;
   the assigning comprises determining the first degree based on the first trust level and the second degree based on the second and third trust levels.

15. The method as recited in claim 14, wherein the first and second trust levels are numerical, and wherein the determining comprises:
   calculating a preliminary first degree by multiplying the first trust level by 100;
   calculating a preliminary second degree by multiplying a sum of the second trust level and the third trust level by 100;
   calculating the first degree by dividing a product of the preliminary first degree and 100 by a sum of the preliminary first degree and the preliminary second degree; and
   calculating the second degree by dividing a product of the preliminary second degree and 100 by the sum of the preliminary first degree and the preliminary second degree.

16. A method implemented in a computing device including one or more processors, comprising:
   receiving a plurality of descriptions associated with media content from a plurality of description providers, each description indicating one or more genres associated with the media content, wherein each of the genres represent a program type;
   utilizing the one or more processors for assigning a relative degree to each of the genres to indicate how related each genre is to the media content relative to another genre, wherein the relative degree assigned to each genre is based on a trust level associated with a description provider that provided a description that indicates the genre; and
   displaying for a user, the relative degree that was assigned to each of the genres.

17. The method as recited in claim 16, wherein each genre is selected from a group of genres comprising action, adventure, horror, comedy, death, mystery, police involvement, thriller, political intrigue, romance, science fiction, period setting, lives drama, sports interest, animal interest, medical interest, legal interest, religious interest, historical interest, war interest, epic production, fantasy folklore, musical, western, monsters, teenage college, ethnic interest, and soap.

18. The method as recited in claim 16, wherein each description further indicates a degree associated with each of the one or more genres, and wherein the assigning comprises:
   calculating a preliminary degree associated with each genre according to the equation:

$$P_G = \sum_{X=1}^{n} (G_X * T_X)$$

where:
   $P_G$ is a preliminary degree associated with a $G^{th}$ genre;
   $G_x$ is a degree associated with the $G^{th}$ genre as indicated by the description of the media content received from an $X^{th}$ description provider;
   n is a number of descriptions of the media content; and
   $T_x$ is a trust level associated with the $X^{th}$ description provider; and
   calculating a relative degree associated with each genre according to the equation:

$$D_G = \frac{(P_G * 100)}{\sum_{X=1}^{m} P_X}$$

where:
   $D_G$ is a relative degree associated with the $G^{th}$ genre; and
   m is a number of genre associated with the media content.

19. A media classification system comprising:
   a processor;
   a memory;
   a media description repository maintained in the memory and executed on the processor, the media description repository comprising:
      a media identification class configured to represent media content;
      a provider class configured to represent providers and associated trust levels;
      a genre degree class configured to represent descriptions of media content in terms of genre degrees, wherein a genre degree indicates a degree to which the media content is associated with a particular genre;
      an association between the media identification class and the genre degrees class that represents a description of a media content; and
      an association between the provider class and the genre degrees class that represents a description of media content received from a description provider.

20. A system comprising:
   a description provider interface to receive a plurality of descriptions of a media content from a plurality of description providers, wherein each of the description providers has an associated trust level; and
   a composite generator to generate a composite description of the media content based on the plurality of descriptions of the media content and the trust levels associated with each of the plurality of description providers, the composite description comprising relative degrees to which the media content relates to each of a plurality of genres.

21. The system as recited in claim 20, wherein the relative degrees are numeric.

22. The system as recited in claim 21, wherein the sum of the relative degrees is 100.

23. The system as recited in claim 20, wherein each of the plurality of genres is selected from a group of genres comprising action, adventure, horror, comedy, death, mystery, police involvement, thriller, political intrigue, romance, science fiction, period setting, lives drama, sports interest, animal interest, medical interest, legal interest, religious interest, historical interest, war interest, epic production, fantasy folklore, musical, western, monsters, teenage college, ethnic interest, and soap.

24. The system as recited in claim 20, further comprising a description provider data repository to associate a trust level with a description provider, and wherein the relative degrees are based on the trust level.

25. The system as recited in claim 20, further comprising a description data repository to store the one or more descriptions of media content and to store the composite description of the media content.

26. The system as recited in claim 20, further comprising a program data provider interface to provide the composite description of the media content to a program data provider for display to a user through an electronic programming guide.

27. The system as recited in claim 20, further comprising a user interface component to facilitate receiving a description of the media content.

28. One or more computer-readable media encoded with instructions that, when executed by a computing system, direct the computing system to execute a method comprising:
receiving, from a first provider having a first trust level, a first description of media content that identifies a first genre associated with the media content;
receiving, from a second provider having a second trust level, a second description of the media content that identifies a second genre associated with the media content; and
assigning a first degree to the first genre and a second degree to the second genre, wherein the first and second genres respectively provide first and second program type categories, and wherein the first degree is based on the first trust level and the second degree is based on the second trust level.

29. The one or more computer-readable media as recited in claim 28, wherein the first degree and the second degree are the same, indicating that the media content is equally associated with the first and second genre.

30. The one or more computer-readable media as recited in claim 28, wherein the first and second degrees are numeric, the first degree comprises a number multiplied by the first trust level, and the second degree comprises the number multiplied by the second trust level.

31. The one or more computer readable media as recited in claim 28, further encoded with instructions that, when executed, direct the computing system to assign a first degree to the first genre and a second degree to the second genre by directing the computing system to:
calculate a preliminary first degree by multiplying the first trust level by a number;
calculate a preliminary second degree by multiplying the second trust level by the number;
calculate the first degree by multiplying the preliminary first degree by the number and subsequently dividing the result by the sum of the preliminary first degree and the preliminary second degree; and
calculate the second degree by multiplying the preliminary second degree by the number and subsequently dividing the result by the sum of the preliminary first degree and the preliminary second degree.

32. The one or more computer-readable media as recited in claim 28, wherein the method further comprises:
a third description of the media content from a third description provider, the third description provider having an associated third trust level,
wherein the first degree is based on the first trust level and the second degree is based on the second and third trust levels.

33. The one or more computer readable media as recited in claim 32, further encoded with instructions that, when executed, direct the computing system to assign a first degree to the first genre and a second degree to the second genre by directing the computing system to:
calculate a preliminary first degree by multiplying the first trust level by a number;
calculate a preliminary second degree by multiplying the sum of the second trust level and the third trust level by the number;
calculate the first degree by multiplying the preliminary first degree by the number and subsequently dividing the result by the sum of the preliminary first degree and the preliminary second degree; and
calculate the second degree by multiplying the preliminary second degree by the number and subsequently dividing the result by the sum of the preliminary first degree and the preliminary second degree.

34. One or more computer-readable media encoded with instructions that, when executed by a computing system, direct the computing system to execute a method comprising:
receiving a plurality of descriptions of media content from a plurality of description providers, with individual ones of the descriptions indicating one or more genre associated with the media content, each of the description providers having an associated trust level, wherein each of the one or more genres represents a program type;
calculating a preliminary degree associated with each genre according to the equation:

$$P_G = \sum_{X=1}^{n} (G_X * T_X)$$

where:
$P_G$ is a preliminary degree associated with a $G^{th}$ genre;
$G_x$ is a degree associated with the $G^{th}$ genre as indicated by the description of the media content received from an $X^{th}$ description provider;
n is a number of descriptions of the media content; and
$T_x$ is a trust level associated with the $X^{th}$ description provider; and
calculating a relative degree associated with each genre according to the equation:

$$D_G = \frac{(P_G * 100)}{\sum_{X=1}^{m} P_X}$$

where:
$D_G$ is a relative degree associated with the $G^{th}$ genre; and
m is a number of genre associated with the media content.

* * * * *